US011886938B2

(12) United States Patent
Goel et al.

(10) Patent No.: US 11,886,938 B2
(45) Date of Patent: Jan. 30, 2024

(54) MESSAGE COMMUNICATION BETWEEN INTEGRATED COMPUTING DEVICES

(71) Applicant: Microsoft Technology Licensing, LLC, Redmond, WA (US)

(72) Inventors: Deepak Goel, San Jose, CA (US); Mattheus C Heddes, Woodinville, WA (US); Torsten Hoefler, Schwyz (CH); Xiaoling Xu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 17/199,209

(22) Filed: Mar. 11, 2021

(65) Prior Publication Data
US 2022/0291976 A1 Sep. 15, 2022

(51) Int. Cl.
*G06F 9/54* (2006.01)
*H04L 51/224* (2022.01)
*H04L 47/50* (2022.01)

(52) U.S. Cl.
CPC ............ *G06F 9/546* (2013.01); *G06F 9/544* (2013.01); *H04L 47/50* (2013.01); *H04L 51/224* (2022.05)

(58) Field of Classification Search
CPC ......... G06F 9/546; G06F 9/544; H04L 47/50; H04L 51/24
USPC ....................................................... 709/206
See application file for complete search history.

(56) References Cited

U.S. PATENT DOCUMENTS

| 5,430,850 | A | 7/1995 | Papadopoulos et al. |
| 7,339,899 | B2 | 3/2008 | Liu et al. |
| 7,774,374 | B1* | 8/2010 | Kizhepat ............... H04L 49/101 707/800 |
| 2010/0162265 | A1* | 6/2010 | Heddes ................... H04L 47/10 719/314 |
| 2010/0191814 | A1* | 7/2010 | Heddes .................. G06F 15/16 709/206 |

(Continued)

FOREIGN PATENT DOCUMENTS

WO 0041365 A1 7/2000

OTHER PUBLICATIONS

Kim, et al., "Special Issue Deep Learning-Based Routing for Network-on-a-Chip (NoC): Opportunities, Challenges, and Solutions", In Journal of Electronics, Sep. 5, 2020, 9 Pages.

(Continued)

*Primary Examiner* — Cheikh T Ndiaye
*Assistant Examiner* — Ayele F Woldemariam
(74) *Attorney, Agent, or Firm* — Alleman Hall Creasman & Tuttle LLP

(57) ABSTRACT

One example provides an integrated computing device, comprising one or more computing clusters, and one or more network controllers, each network controller comprising a local data notification queue to queue send message notifications originating from the computing clusters on the integrated computing device, a remote data notification queue to queue receive message notifications originating from network controllers on remote integrated computing devices, a local no-data notification queue to queue receive message notifications originating from computing clusters on the integrated computing device, and a connection scheduler configured to schedule sending of data from memory on the integrated computing device when a send message notification in the local data notification queue is matched with a receive message notification in the remote data notification queue, and to schedule sending of receive message notifications from the local no-data notification queue.

20 Claims, 7 Drawing Sheets

(56) References Cited

U.S. PATENT DOCUMENTS

| | | | |
|---|---|---|---|
| 2010/0325318 A1* | 12/2010 | Desoli | H04L 49/9052 |
| | | | 710/110 |
| 2014/0010079 A1 | 1/2014 | Monchiero et al. | |
| 2015/0200873 A1 | 7/2015 | Wittenschlaeger | |
| 2015/0326698 A1* | 11/2015 | Mogul | H04L 69/32 |
| | | | 709/217 |
| 2021/0011849 A1* | 1/2021 | Simpson | G06N 3/08 |
| 2022/0091886 A1* | 3/2022 | Campbell | G06F 9/4887 |

OTHER PUBLICATIONS

Kim, Wooseong, "Toward network function virtualization for cognitive wireless mesh networks: a TCP case study", In EURASIP Journal on Wireless Communications and Networking, Oct. 6, 2015, 16 Pages.

Langston, Jennifer, "Microsoft announces new supercomputer, lays out vision for future AI work", Retrieved from: https://blogs.microsoft.com/ai/openai-azure-supercomputer/, May 19, 2020, 10 Pages.

Marescaux, Theodore Michel, "Mapping and Management of Communication Services on MP-SoC Platforms", In Dissertation Abstracts International, Sep. 7, 2007, 322 Pages.

Swarbrick, et al., "Network-on-Chip Programmable Platform in Versal™ ACAP Architecture", In Proceedings of the ACM/SIGDA International Symposium on Field-Programmable Gate Arrays, Feb. 24, 2019, pp. 212-221.

"International Search Report and Written Opinion Issued in PCT Application No. PCT/US22/018234", dated Jun. 27, 2022, 13 Pages.

\* cited by examiner

MESSAGE COMMUNICATION BETWEEN INTEGRATED COMPUTING DEVICES

BACKGROUND

Deep learning is a branch of machine learning that utilizes multiple layers between input and output layers. Deep learning may be implemented by a computing network that requires computationally intensive training.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed herein that relate to communicating over a communication network. One example provides an integrated computing device comprising one or more computing clusters and one or more network controllers. Each network controller comprises a local data notification queue configured to queue send message notifications originating from one or more of the computing clusters on the integrated computing device, a remote data notification queue configured to queue receive message notifications originating from one or more remote network controllers on one or more remote integrated computing devices, a local no-data notification queue configured to queue receive message notifications originating from the one or more computing clusters on the integrated computing device, and a connection scheduler configured to schedule sending of data from memory on the integrated computing device when a send message notification in the local data notification queue is matched with a receive message notification in the remote data notification queue, and to schedule sending of receive message notifications from the local no-data notification queue.

DETAILED DESCRIPTION

As deep learning networks become larger and more computationally intensive, it becomes increasingly difficult to train such a network using a single machine learning device. Thus, in order to train large deep learning models in a reasonable amount of time, a large number of devices may be connected in a high-performance network. However, as deep learning networks are partitioned, the network bandwidth requirement per device can grow quickly.

In traditional networked computing devices, network interface hardware is often separate from processing hardware. When used in training deep learning networks, the separate network interface and processing devices each occupy space, consume power, and contribute to the overall cost of computing devices used in the deep learning network system. To address such issues, network interface hardware can be integrated with processing hardware on a same semiconductor die package (e.g. on a same semiconductor die, or connected to one or more semiconductor dies via package interconnects). Such integration helps to lower power usage, size and cost compared to the use of separate hardware. However, current network communications protocols may not be configured to efficiently utilize the bandwidth offered by the integration of computing and network interface hardware.

Accordingly, examples are disclosed herein that relate to communicating between integrated computing devices in a communication network, such as a deep learning network. Briefly, the disclosed examples control the transfer of machine learning data via variable size messages from one compute node to another in a manner that reduces memory space and bandwidth resources compared to current communications protocols. Further, the disclosed example protocols utilize a network controller architecture comprising a three-queue structure configured to queue incoming and outgoing notification messages in such a manner that outgoing notifications regarding data to be received (receive message notifications) are not blocked by outgoing notifications regarding data to be sent (send message notifications).

Figure 1:
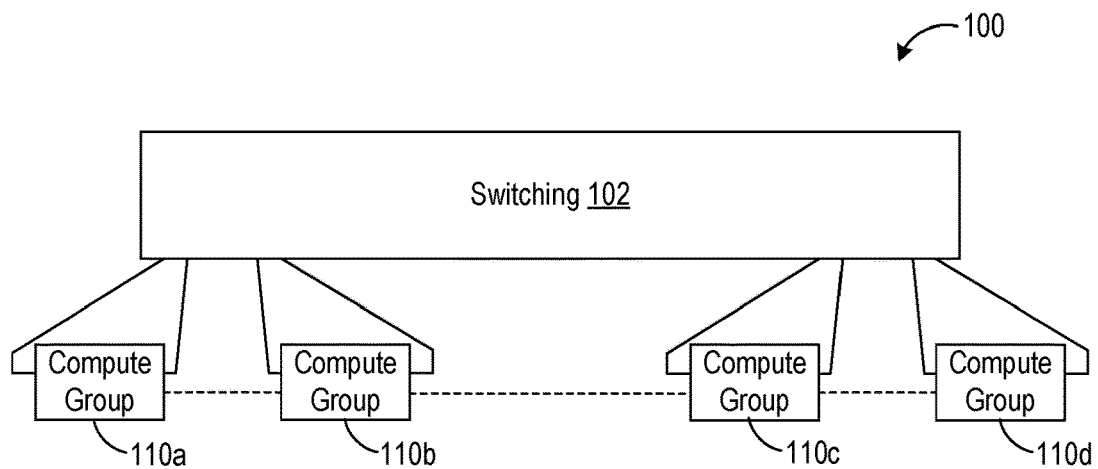
FIG. 1 shows a block diagram illustrating an example network topology for a communication network.

Prior to discussing these examples in more detail, FIG. 1 shows a topology of an example data network 100 connecting groups of integrated computing devices. Each computing device may connect to a plurality of parallel data network planes using multiple network interfaces on the computing device. Data network 100 includes a switching arrangement 102 comprising one or more switches and/or routers arranged in any suitable topology. The switches and/or routers may be Ethernet switches, for example. Each of the switches and/or routers communicates with one or more compute groups 110, as shown at 110a-d. Each compute group 110 comprises a plurality of integrated computing/network interfaces connected together in a suitable network topology, an example of which is discussed below with regard to FIG. 2.

Figure 2:
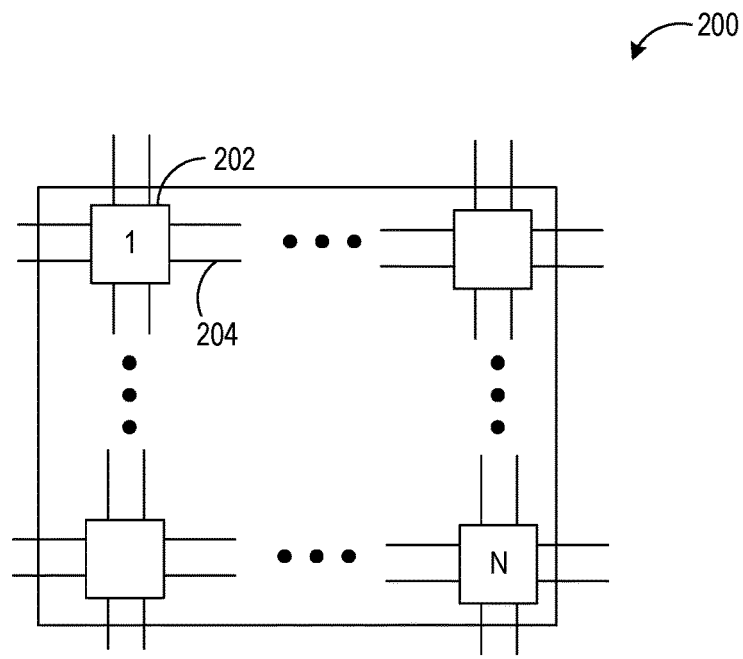
FIG. 2 shows a block diagram illustrating an example topology for a group of integrated computing devices in a communication network.

Each of compute groups 110a-d includes a plurality of computing nodes, each node comprising an integrated computing device. FIG. 2 shows an example compute group 200 having an arbitrary number N of integrated computing devices 202 arranged in any suitable topology. FIG. 2 is an example of a group that can be used as any of compute groups 110a-110d. Each integrated computing device 202 comprises a semiconductor die comprising one or more processors, one or more network interfaces, and one or more memories, such as high-bandwidth memory (HBM), SRAM, DDR, and/or any other suitable memory technology. In the depicted example, each integrated computing device 202 comprises eight network interfaces, indicated by eight connections 204 to other integrated computing devices, either within compute group 200 and/or to T0 switch(es) and/or router(s). In other examples, any other suitable number of network interfaces may be used. The N integrated computing devices within compute group 200 communicate with other nodes either via point-to-point connections or one or more hops. Devices in the periphery of the compute group 200 communicate with devices in other compute groups via switches and/or routers in a network topology, such as that shown in FIG. 1. In other examples, a group of computing device nodes may have any other suitable architecture.

Figure 3:
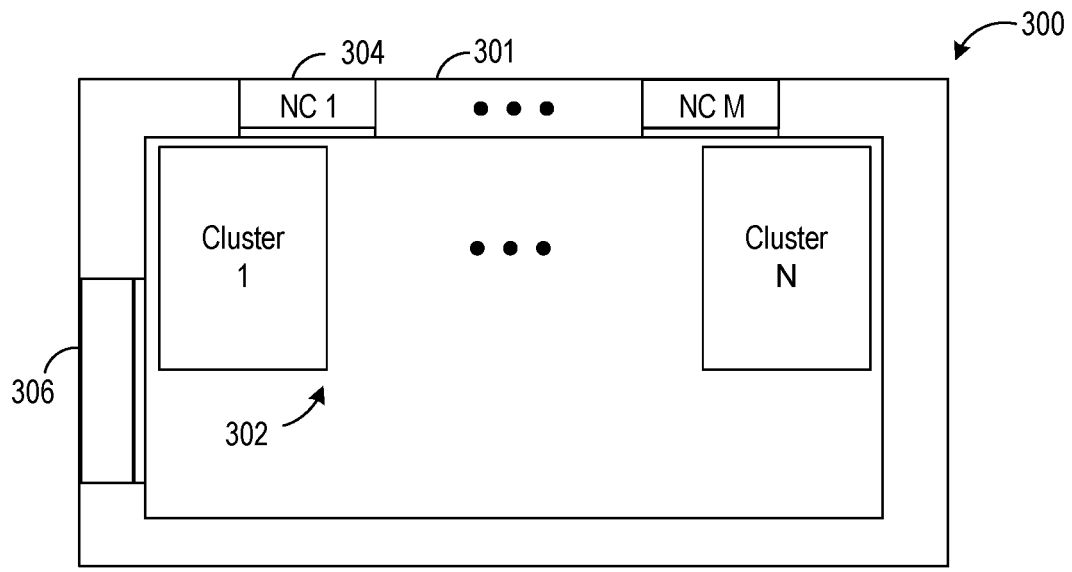
FIG. 3 shows a schematic representation of an example integrated computing device.

FIG. 3 shows a block diagram of an example integrated computing device 300 suitable for use as each of integrated computing devices 202. Integrated computing device 300 comprises a semiconductor die package 301 comprising an arbitrary number N of computing clusters 302, where N indicates an integer of 1 or greater. Clusters 302 may be formed on a same semiconductor die, or on two or more different dies connected by package interconnects. Integrated computing device 300 further includes M network controllers 304, where M represents an integer of 1 or greater. Network controllers 304 may be located on the same semiconductor die(s) as clusters 302, or may be on one or more different dies connected via package interconnects. In other examples, network controllers 304 and computing clusters 302 may reside on separate dies and/or separate die packages. Each network controller is configured to control communications between one or more clusters 302 and one or more external integrated computing devices 300, including external integrated computing devices in a same group 200 as well as in different groups. Integrated computing device 300 also includes memory 306, for example HBM, SRAM, DDR, etc.

Figure 4:
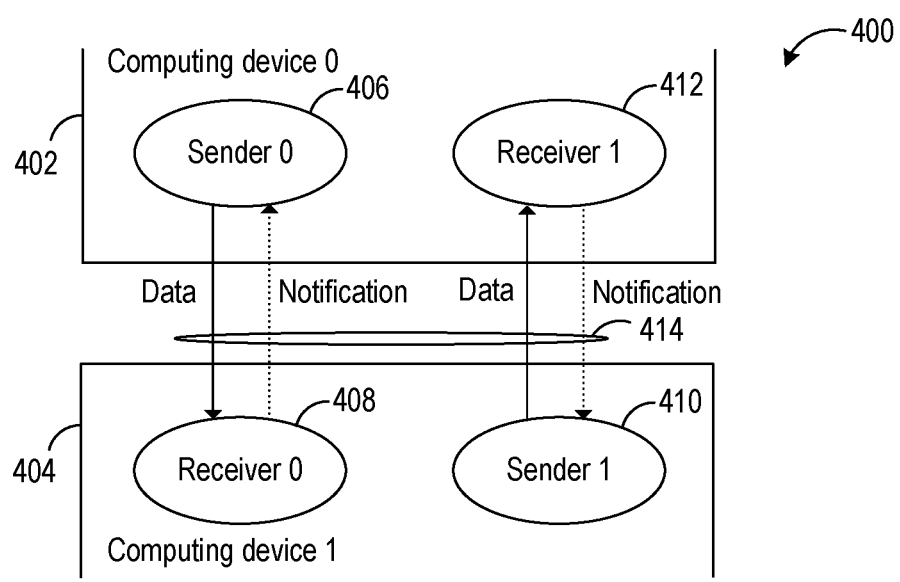
FIG. 4 shows a diagram illustrating example communication flow between two integrated computing devices.

FIG. 4 shows an example communication flow diagram between two integrated computing devices, illustrated as computing device-0 402 and computing device-1 404. Computing device-0 402 comprises sender-0 406 implemented on a processor to transfer data to receiver-0 408 of computing device-1 404. Further, computing device-1 404 comprises sender-1 410 to transfer data to receiver-1 412 of computing device-0 402. Here, a transport layer connection 414 between computing device-0 402 and computing device-1 404 supports a bi-directional transfer of data messages between the senders and receivers. Multiple transport layer connections may be utilized to support corresponding multiple parallel and concurrently active bi-directional transfers.

For a data message transfer, senders 406, 410 and receivers 408, 412 may implement a receiver-initiated model that "pulls" from the destination computing device. As explained in more detail below, communication between the sender and receiver nodes are asynchronous. Further, in each integrated computing device, computing clusters can send messages to the network controllers on the integrated computing device and receive messages from the network controllers via a message network-on-chip (NOC) that provides for communication between the computing clusters and the network controllers on the integrated computing device.

Figure 5:
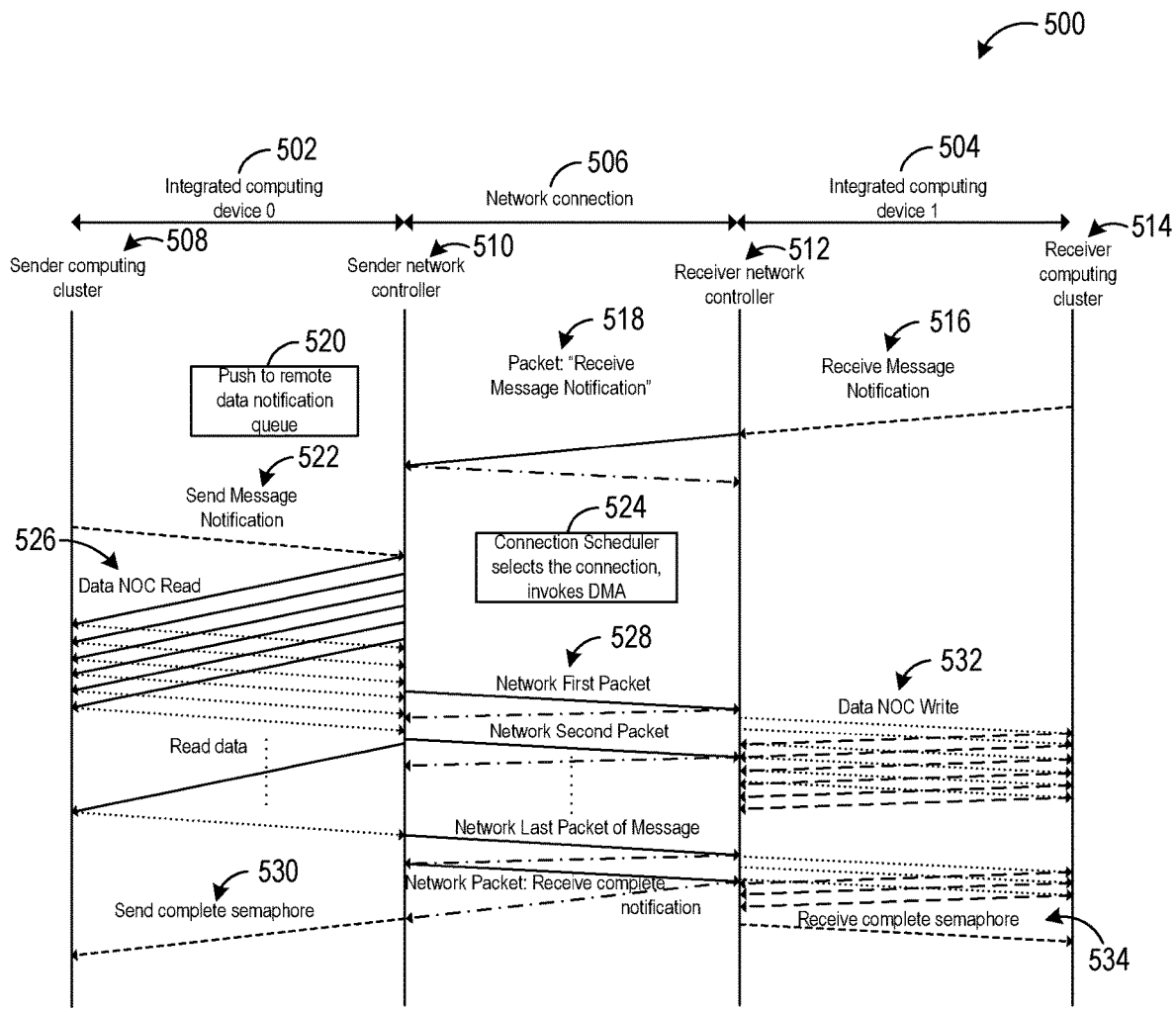
FIG. 5 shows a time flow diagram illustrating an example communications protocol.

FIG. 5 shows a timing diagram 500 that illustrates an example protocol for transferring data between a sender and a receiver cluster. As mentioned above, the disclosed communication protocol can control network transfer messages from one compute node to another in a manner that reduces memory space and bandwidth resources compared to current protocols.

The illustrated communication protocol comprises various different types of notifications, including a send message notification, a send complete notification, a receive message notification, and a receive complete notification. A receive message notification is a notification that the receiver-side cluster is ready to receive data. The receive message notification is sent from a receiver-side cluster to a receiver-side network controller on a receiver-side integrated computing device. The receiver-side network controller then sends the receive message notification to a sender-side integrated computing device to inform the sender-side network controller that the receiver-side cluster is ready to receive data. Asynchronously, the sender-side cluster sends a send message notification to the sender-side network controller to inform the sender-side network controller that the sender cluster is ready to send the data. As described in more detail below, these notifications are stored in respective queues on the sender-side network controller. Once both of these notifications have been received in any order, a scheduler schedules the sending of data by the sender side network controller.

The send message notification and the receive message notification each may have any suitable format. In some examples, the send message notification may comprise data such as a connection number, a source memory address, a message size, a send tag, and a send complete semaphore.

The source memory address comprises an address to a consecutive array of bytes, where the size of the array is the message size. The message size field in the send message notification may address message sizes of any suitable range, e.g. from 0 bytes to 64 MB in some implementations. The source memory address field treats all data as linear, even though the data stored at the specified address may not be linear in shape. The network controller on the sender-side maps the actual memory shape to the consecutive array of bytes specified in the message size field.

The send tag identifies a message, and the connection number identifies a channel. The send tag may be used to match with a receive tag of a corresponding receive message notification to proceed with the sending of data. If the send tag and receive tag do not match, an error is flagged. In some examples, the send tag and receive tag may be used in addition to the connection numbers to trigger the sending of data.

The send complete semaphore is a semaphore that is sent back to the sender-side cluster by the sender-side network controller via the message NOC upon completing the sending of data to the receiver-side network controller. The sender computing cluster may then free the source buffer after receiving the send complete semaphore. In some examples, the send complete semaphore may include a semaphore address, a semaphore bit-vector, and a semaphore value. In some examples, a separate semaphore may be updated as a response to the send complete semaphore. For example, a counting semaphore may be used to track pending send message notifications to avoid overflowing the queue in the network controller. The send complete semaphore may be doubly used as a notification and a credit return between the computing cluster and a connection's network controller local data notification queue. The bit vector can be used to indicate a cluster in an integrated computing device.

The receive message notification may include data fields such as a connection number, a destination memory address, a receive buffer size, a receive tag, and a receive complete semaphore. The destination memory address specifies where data sent by the sender-side cluster is to be stored on the receiver side. This memory address (plus any applicable offset) is included in data packets sent by the sender-side. As such, the receiver-side network controller is informed by each data packet as to where to write the data contained in the packet. As the receiver-side computing cluster knows the maximum size of the message to be received in the buffer and has allocated memory accordingly, the receive message notification carries the receive buffer size. An exception will be raised if the message size from the corresponding send message notification is greater than the receive buffer size, and no transfer of data will occur. Further, an exception will be raised if the receive tag does not match with the corresponding send tag of the send message notification.

The receiver-side network controller sends the receive complete semaphore on the receiver-side message NOC from the network controller to the cluster after the network controller has successfully written data from the remote integrated computing device at the buffer specified by the memory address provided in the receive message notification. In some examples, the receive complete semaphore may include a semaphore address, a semaphore bit-vector, and a semaphore value. The semaphore informs the integrated computing device that the received data is present in the receive buffer. If received data is compressed, its size may be specified as part of the data in the form of a compression header.

Continuing with FIG. 5, timing diagram 500 illustrates messages exchanged when sending data from a sender computing cluster 508 in a first integrated computing device 502 to a receiver computing cluster 514 in a second integrated computing device 504 across a network connection 506. Diagram 500 schematically shows a timeline each for the sender computing cluster 508, sender network controller 510, receiver network controller 512, and receiver computing cluster 514. It will be understood that for each of the sender computing cluster and the receiver computing cluster, the timeline includes the corresponding storage (e.g. HBM, SRAM) combined into a single timeline for simplicity purposes.

At 516, the receiver cluster 514 issues a receive message notification to the receiver network controller 512 in integrated computing device 504, indicating that the receiver cluster 514 is ready to receive specified data. The receive message notification has a destination memory address and a receive complete semaphore, as described above. The receive message notification is queued at the receiver network controller in a local no-data queue, as described in more detail below. At 518, the receiver network controller 512 creates a network packet using contents in the receive message notification received on the message NOC, and sends the packet to the sender network controller 510.

At 520, the sender network controller 510 receives the receive message notification, extracts information including the destination memory address and receive complete semaphore, and stores the extracted information in a remote data notification queue, where a separate remote data notification queue is defined for each transport layer connection. The remote data notification queue also is described in more detail below.

At 522, the sender computing cluster 508 issues a send message notification with a source memory address, message size, and a send complete semaphore. In this example, the sender network controller 510 issues the send message notification after the sender network controller receives the receive message notification from the receiver network controller 512. In other examples, the send message notification can be received by the sender network controller 510 before the receive message notification due the asynchronous nature of the protocol.

The sender computing cluster 508 passes message size with the send message notification such that the sender network controller 510 can use the message size in the connection scheduler and segmenter, which will be described below.

At 524, the sender network controller 510 extracts information from the send message notification and queues it in a local data notification queue. When a send message notification and a receive message notification for a connection are respectively stored in the local data notification queue and the remote data notification queue, at 526, the sender network controller 510 starts direct memory access to retrieve data from the source memory address that was included with the send message notification. Multiple read transactions over the sender device NOC may be used to read the data from memory. At 528, the sender network controller 510 creates a network packet after direct memory access has returned enough bytes to create the network packet. Each network packet created by the sender network controller 528 includes the destination memory address at which the data will be written on the receiver computing cluster 514. After the sender network controller 510 has sent all the network packets of the message, it then sends a network packet with the receive complete semaphore to the receiver network controller 512. In some examples, the sender network controller 510 can send the receive complete semaphore before acknowledging packets arrive from the receiver network controller 512.

Continuing, at 530, the sender network controller 510 issues a send complete semaphore on the NOC in integrated computing device 502 after the sender network controller 510 receives acknowledge for all the packets. After receiving the send complete semaphore notification, the sender computing cluster 508 can reuse the buffer at the sender cluster from which the data was sent.

As mentioned above, each data packet received by the receiver network controller 512 carries with it the destination memory address. A network direct memory access (NDMA) engine in the receiver network controller 512 performs write transactions on the data NOC with the destination memory address in the packet, at 532. The receiver network controller 512 waits for completion of all pending write transactions. After the NDMA engine has all of the acknowledge transactions from the write transactions, the receiver network controller 512 issues a receive complete semaphore on the message NOC and sends the receive complete semaphore to the receiver computing cluster 514, as shown at 534.

Figure 6:
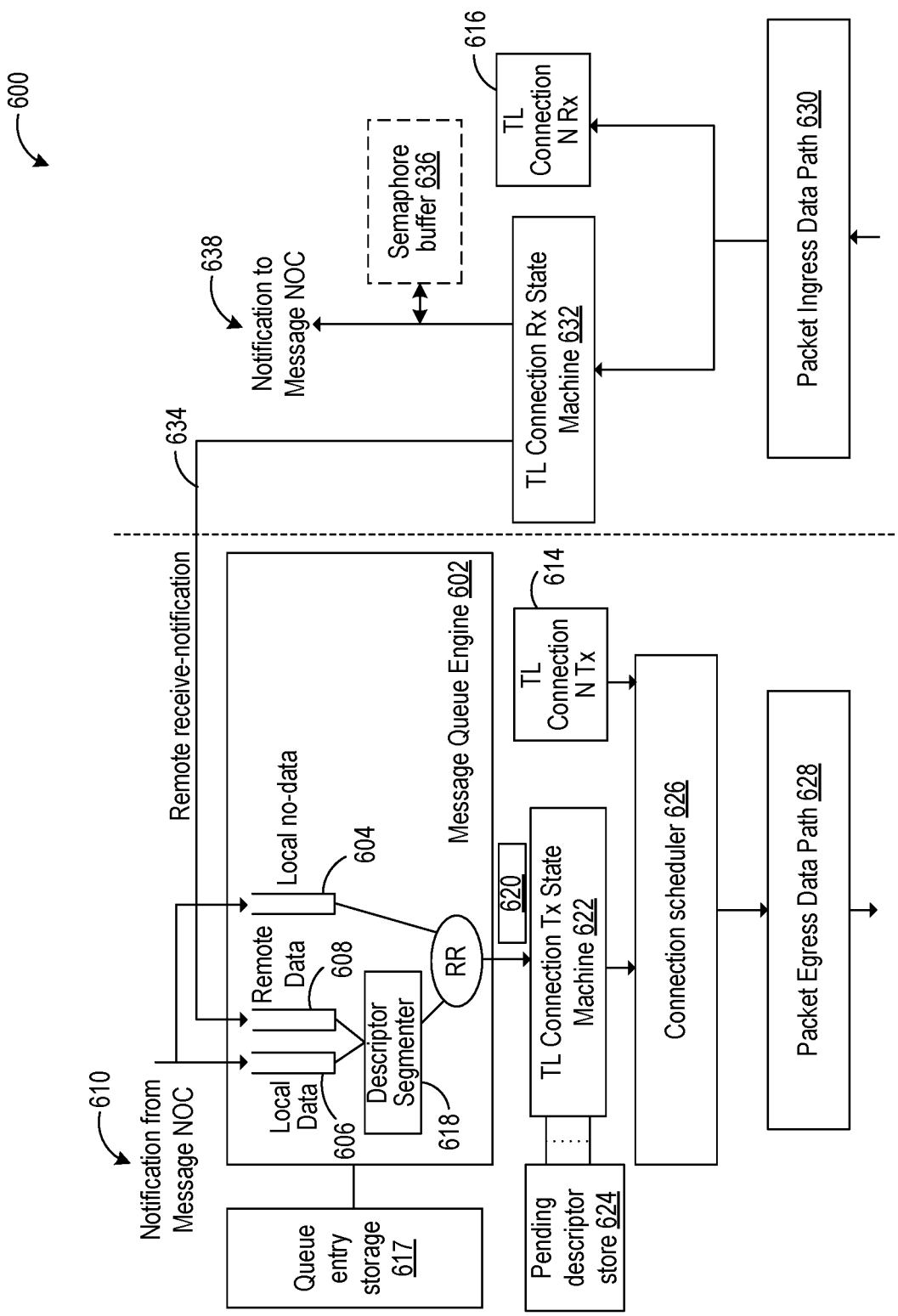
FIG. 6 shows a block diagram of an example network controller.

As mentioned above, the network controllers disclosed herein are configured with a triplet configuration of message queues. FIG. 6 shows a block diagram illustrating example components of a network controller 600 for controlling data and message egress and ingress. The controller 600 comprises a message queue engine 602 that implements three notification queues per transport layer connection in the transmit direction. In some examples, the queue entry storage may be shared among all endpoint transport layer connections, and the queues may be implemented as circular buffers with a programmable number of entries.

The three type of message queues in the queue-triplet include a local no-data notification queue 604, a local data notification queue 606, and a remote data notification queue 608. The local no-data notification queue 604 is used for queueing receive notifications received from clusters on the same integrated computing device as the network controller 600. The use of a separate local no-data notification queue 604 from the two other queues (described below) ensures that outgoing receive message notifications are not blocked by an outgoing send message notification awaiting a matching incoming receive message notification from a remote integrated computing device. The network controller will create a single transport layer packet from the information stored in a receive message notification.

The local data notification queue 606, as mentioned briefly above, is used to queue send message notifications received from a local cluster for matching with receive message notifications received from a remote integrated computing device. The local data notification queue 606 stores extracted contents (source memory address, message size and send control notification) from the send message notification. Zero-byte message transfer is supported using the local data notification queue. The remote data notification queue 608 stores receive message notifications from a remote integrated computing device, and likewise stores extracted contents from the receive message notifications.

On the egress side, when a receive message notification from the local message-NOC is received at 610 that originates from the one or more computing clusters on the integrated computing device, the receive message notification is queued in the local no-data notification queue 604. When a send message notification from the local message-NOC is received at 610 that originates from the one or more computing clusters on the integrated computing device, the send message notification is queued in the local data notification queue 606. The network controller can manage N simultaneous connections to one or more remote integrated computing devices on the egress side, as indicated at 614 (transport layer connection N Tx). On the ingress side, incoming remote receive message notifications from remote integrated computing devices are queued in the remote data notification queue 608. The network controller can have N connections from one or more remote integrated computing devices on the ingress side, as indicated at 616 (transport layer connection N Rx). Entries in each queue are stored in queue entry storage 617.

As mentioned above, the message queue engine 602 will read out an entry when both the local data notification queue 606 and the remote notification queue 608 are non-empty (both have a message notification for a same connection) and can send a descriptor for the connection. A descriptor segment machine 618 creates network packet descriptors for every connection, and sends each packet descriptor (indicated at 620) to transport layer connection transmit state machine 622 in a round robin manner (indicated by RR). At the packet descriptor level, logic in the message queue engine 602 arbitrates between the local no-data notification queue 608 and the local data notification queue 610.

The transport layer connection transmit state machine 622 will store the transmitted packet descriptor 624 in pending descriptor store 620 until it receives acknowledgement from the receiving end. Once acknowledgement is received, the packet descriptor 624 is passed to connection scheduler 626 which determines the appropriate packet(s) to transmit via packet egress data path 628. The transport layer connection transmit state machine 622 implements packet retransmission in case a negative-acknowledgement packet is received or the transport layer connection times out. The NDMA engine reads payload content directly from memory, and stacks the network headers and encrypts the packet. By using direct memory access, a buffer for storing data to be transmitted can be omitted from the network controller, thereby providing for a more compact network controller design and also reducing a number of computing cycles used to transfer data from memory on the node to a remote node. Further, if a packet is lost over the network due to bit-error or congestion in the network, the packet may be retransmitted. A retransmitted packet payload will be read from the device memory and a new header will be appended to the packet. The network controller may keep a packet buffer for Priority Flow Control (PFC), without keeping a retransmission packet buffer.

On the ingress side, the packet ingress data path 630 parses the received packet header, extracts information, and passes the information to transport layer connection receive state machine 632. If the incoming packet is a receive message notification packet, logic stores the destination memory address and receive control notification fields in the remote data notification queue, as shown at 634. Logic issues other notification packets on the message NOC. For data packets, the NDMA engine copies the payload directly to memory, as shown at 638.

The use of the three message queues as disclosed allows send message notifications originating locally, receive message notifications originating locally, and receive message notifications originating remotely to be queued separately from each other, which may help to lower latency. For example, the queue-triplet allows receive message notifications originating locally to be sent independently from the send message notifications, and thereby prevents any blocking of receive message notifications by queued send message notifications. Further, each connection is bidirectional, such that receiving and sending can occur in parallel. Each computing cluster can therefore be a receiver and a sender. If a sender computing cluster issues a send message notification, but has not yet received the corresponding receive message notification from a receiver computing cluster, the receive message notification will not be blocked from receipt, as the remote data notification queue is capable of queueing any receive message notifications from remote computing clusters. Thus, even if the local data notification queue builds up with send message notifications, the remote data notification queue can continue to queue receive message notifications originating remotely. Further, the local no-data notification queue ensures that receive message notifications originating locally do not become backed up in queue while waiting for a matching send message notification from a remote computing cluster, but are instead stored in a separate queue.

Thus, on a local compute node, when sending a send message notification from a computing cluster to the network controller, the send message notification is queued in the local data notification queue. When a receive message notification originating remotely is received, the receive message notification is queued in the remote data notification queue, and if the receive message notification matches with a send message notification queued in the local data notification queue, then data transfer commences, and the matching notifications are removed from the queue. Send message notifications can continue queueing even while waiting for matching remote receive message notifications.

Meanwhile, the computing cluster may send a receive message notification to the network controller, and queue the receive message notification in the local no-data notification queue for sending to remote computing clusters. This allows receive message notifications to be sent out without waiting for matching to occur in the local data notification queue and the remote data notification queue, thereby reducing latency.

In some examples, a semaphore buffer 636 may be optionally included on the ingress side in local memory. The semaphore buffer 636 may allow data packets to be received out of order at the receiver side by buffering the semaphore received in a "receive complete" packet if this packet is received out of order. After all data is received and written to memory, the semaphore stored in the semaphore buffer can be sent to the computing cluster. In other examples, the semaphore buffer can be omitted, and error messages can be sent from the receiver network controller to the sender network controller when an out-of-order packet is received. This helps to ensure that the semaphore-containing "receive complete" packet is received last, thereby allowing the semaphore to be sent to the cluster without buffering.

The three message queues may take any suitable form. In some examples, each network controller may support many connections, such as on the order of one thousand connections. However, one thousand connections generating data simultaneously at 50 GB per second each (for example) may be challenging to accommodate. Some of these connections may be transit connections as well (i.e. hops between a sender and a receiver). A network controller may therefore allocate maximum entries statically for each notification queue, and determine this number based on average message size communicated over the connection, connection RTT, and connection throughput. The minimum queue depth may be two entries in some examples, or other suitable depth in other examples. The network controller also programs the start address of the queue-triplet, where the start address is aligned to queue triplet granularity.

The message queue engine may keep a head-pointer and tail-pointer to keep track of pending entries for each queue in the queue-triplet. Each queue may be implemented using a circular buffer. If the maximum supported queue-depth is 1024 entries, the pointer width would be 11 bits. Three sets of pointers may be used for each queue separately. At queue and connection setup, pointers are initialized to zero.

Figure 7:
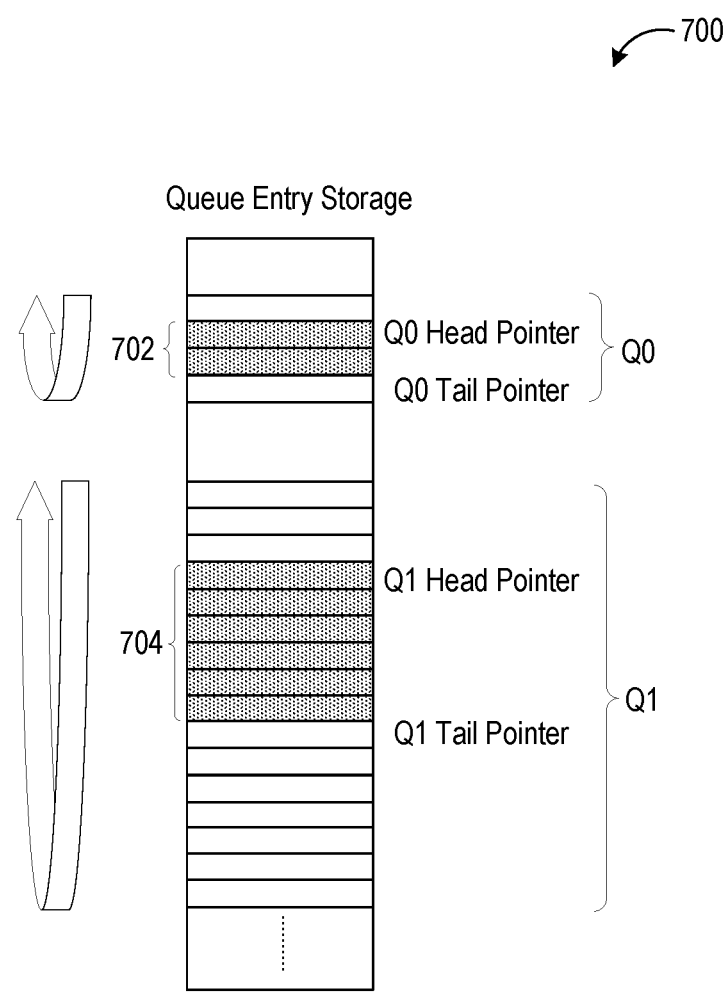
FIG. 7 shows a block diagram of an example notification queue.

FIG. 7 shows an example queue entry storage 700 in the message queue engine, where the queue entry storage 700 is shared across two different sizes of queues. Queue 0 (Q0) is sized to store a maximum (depth size) of four entries, whereas Queue 1 (Q1) is sized to store a maximum (depth size) of 16 entries. The start address of Q0 is 0x4, aligned to four entries, and the start address of Q1 is 0x10, aligned to 16 entries. The Q0 head pointer is equal to 1, the Q0 tail pointer is equal to 3, the Q1 head pointer is equal to 3, and the Q1 tail pointer is equal to 9. Q0 has two pending entries, at 702, and Q1 has six pending entries, at 704.

Figure 8:
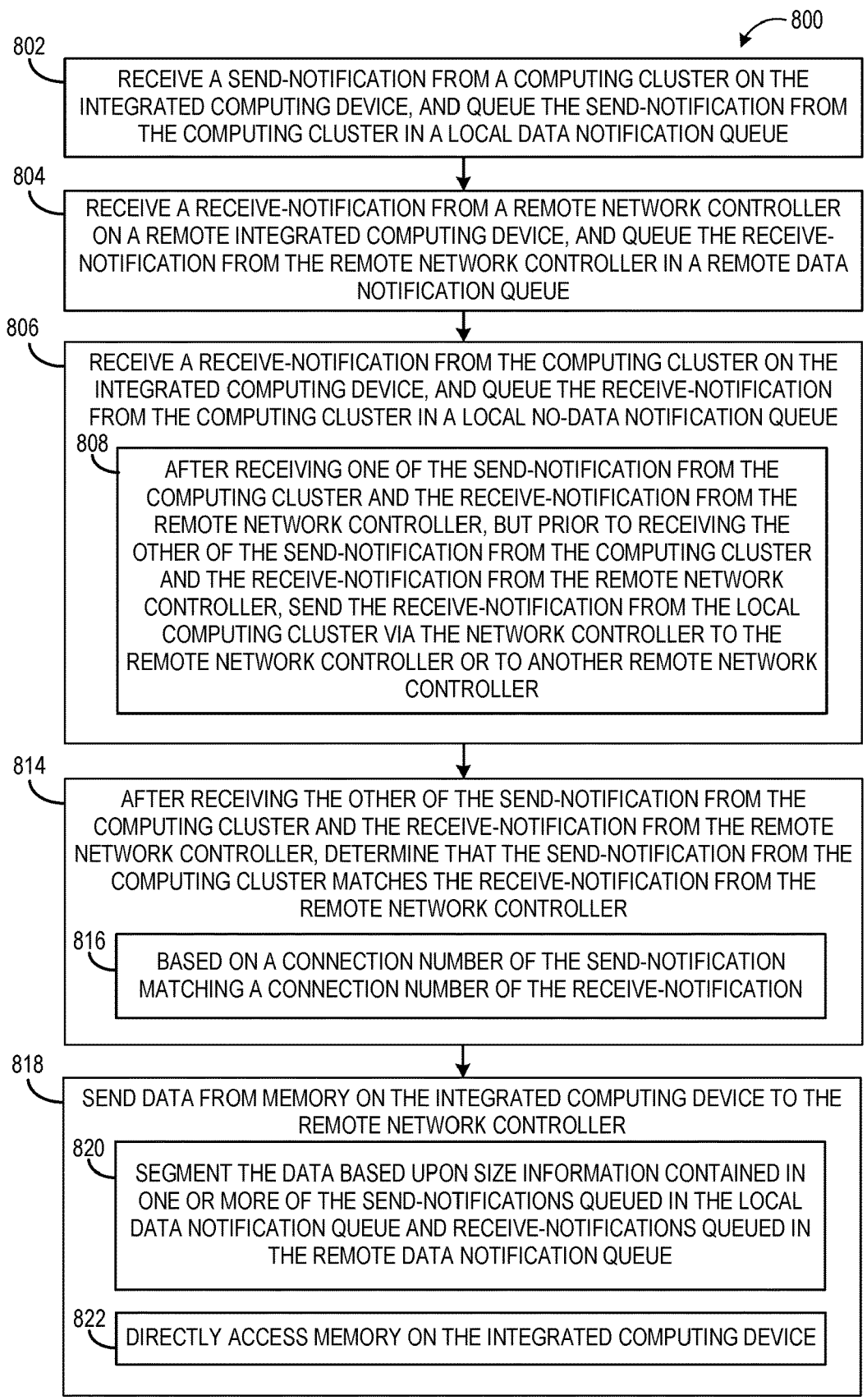
FIG. 8 shows a flow diagram illustrating an example method of communicating on an integrated computing device.

FIG. 8 shows an example method 800 of communicating on an integrated computing device. Method 800 may be enacted on integrated computing device 300, 502, and 504 as examples. Method 800 includes, at 802, receiving a send message notification from a computing cluster on the integrated computing device, and queue the send message notification from the computing cluster in a local data notification queue. Method 800 further includes, at 804, receiving a receive message notification from a remote network controller on a remote integrated computing device, and queueing the receive message notification from the remote network controller in a remote data notification queue. As mentioned above, these notifications can be received asynchronously and in any order.

Method 800 further includes, at 806, receiving a receive message notification from the computing cluster on the integrated computing device, and queueing the receive message notification from the computing cluster in a local no-data notification queue. As the receive message notification received from the local computing cluster is queued in a different queue than the send notification received from the local computing cluster, the receive message notification is not blocked by the send message notification while waiting for a matching receive message notification from a remote cluster. As such, method 800 further includes, at 808, after receiving one of the send message notification from the computing cluster and the receive message notification from the remote network controller, but prior to receiving the other of the send message notification from the computing cluster and the receive message notification from the remote network controller, sending the receive message notification from the local computing cluster via the network controller from the local no-data notification queue to the remote network controller or to another remote network controller.

Method 800 further includes, at 814, after receiving the other of the send message notification from the computing cluster and the receive message notification from the remote network controller, determining that the send message notification from the computing cluster matches the receive message notification from the remote network controller. Determining whether they match may be based on a connection number of the send message notification matching a connection number and/or a tag of the receive message notification, at 816. Upon matching, method 800 includes, at 818, sending data from the memory on the integrated computing device to the remote network controller. Sending the data may include, at 820, segmenting the data based upon size information contained in one or more of the send message notifications queued in the local data notification queue and receive message notifications queued in the remote data notification queue. This segmenting may treat the data as being linear in shape. Where the actual data stored has a different shape, the network controller can map the segments onto the actual data shape. The data then may be directly accessed from memory on the integrated computing device, as indicated at 822, which obviates buffering data storage on an intermediary and helps to reduce latency. Likewise, the network controller on the receive side can map the linear arrangement of bytes of received data into a buffer of any shape for writing by direct memory access, which may be different than the shape of the memory on the sending device from which the data originated.

The examples disclosed herein presents various advantages compared to current systems. For example, the disclosed system provides a lower-cost silicon design for machine learning with a small number of connections, relatively long-lived connections, relatively large messages, and uses a receiver-driven protocol. The disclosed system also allows for non-blocking and asynchronous communication, "in order" processing of messages over a logical connection, and multiplexing of many parallel connections over a physical interface as a result of the message queue engine design, as described above. The disclosed system also supports low-latency semaphore transport, as when sending a semaphore, the semaphore is queued in the local no-data notification queue, while data is queued in separate queues. Further, the disclosed system supports a receiver implementation to commit network packets to the application buffer, without a network controller buffer.

The disclosed system further supports multi-path of network packets without a reorder buffer on the receiver, even where data packets arrive out of order. Compared to current systems where data packets must arrive in order, the disclosed protocol enables packets to arrive out of order. However, typically a reorder buffer is used to reorder the packets. Here, the system design allows a receiver to receive packets out of order without a reorder buffer, e.g. via as semaphore buffer combined with direct memory access based upon the destination memory address being contained in all received data packets.

The disclosed system further has shared queue structures among egress connections, where one memory structures is shared across many connections, and supports multi-(endpoint) Hop connections and can deposit data at hops. The disclosed system may implement a simplified congestion avoidance protocol based on a rate limiter per connection at the sender node, where the receiver can send a flag in a packet to indicate a level of congestion, and the sender can reduce the rate of packet sending by throttling to decrease congestion. Throttling may be automatically stopped based on a time-out instruction. Throttling may occur in the egress data path, e.g. in the connection scheduler. The disclosed system also may support a programmable window per connection to limit a number of pending packets, in addition to a programmable rate.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
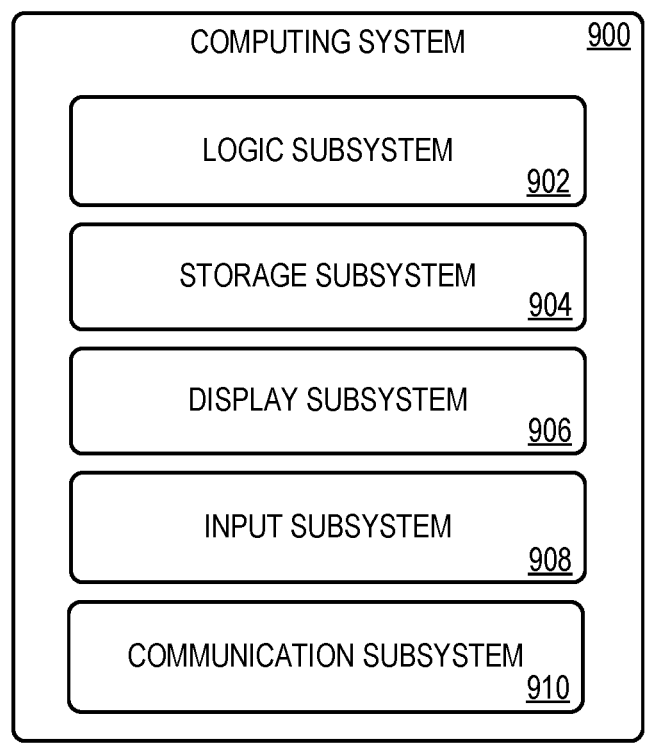
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 902 may include one or more processors configured to execute software instructions. Additionally or alternatively, logic subsystem 902 may include one or more hardware or firmware logic machines configured to execute hardware or firmware instructions. Processors of logic subsystem 902 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 902 may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

Communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides an integrated computing device, comprising one or more computing clusters, and one or more network controllers, each network controller comprising a local data notification queue configured to queue send message notifications originating from one or more of the computing clusters on the integrated computing device, a remote data notification queue configured to queue receive message notifications originating from one or more remote network controllers on one or more remote integrated computing devices, a local no-data notification queue configured to queue receive message notifications originating from the one or more computing clusters on the integrated computing device, and a connection scheduler configured to schedule sending of data from memory on the integrated computing device when a send message notification in the local data notification queue is matched with a receive message notification in the remote data notification queue, and to schedule sending of receive message notifications from the local no-data notification queue. The network controller may additionally or alternatively be configured to send data from the memory by directly accessing the memory. Each of the send message notifications may additionally or alternatively include a connection number, a source memory address, a message size, a send tag, and a send-complete semaphore. Each of the receive message notifications may additionally or alternatively include a connection number, a destination memory address, a receive buffer size, a receive tag, and a receive-complete semaphore. Each network controller may additionally or alternatively be configured to determine when a send message notification in the local data notification queue is matched with the receive message notification in the remote data notification queue based on a connection number of the send message notification matching a connection number of the receive message notification. Each of the plurality of network controllers may additionally or alternatively be configured to connect to a plurality of remote network controllers. The integrated computing device may additionally or alternatively include a semaphore buffer configured to hold semaphores from the receive message notifications originating from the one or more remote network controllers. The integrated computing device may additionally or alternatively include a segmenter configured to segment the data based upon size information contained in one or more of the send message notifications queued in the local data notification queue and receive message notifications queued in the remote data notification queue before sending the data from the memory on the integrated computing device.

Another example provides, on an integrated computing device comprising one or more computing clusters and one or more network controllers, a method enacted on a network controller of the plurality of network controllers, the method comprising receiving a send message notification from a computing cluster on the integrated computing device, and queueing the send message notification from the computing cluster in a local data notification queue, receiving a receive message notification from a remote network controller on a remote integrated computing device, and queueing the receive message notification from the remote network controller in a remote data notification queue, receiving a receive message notification from the computing cluster on the integrated computing device, and queueing the receive message notification from the computing cluster in a local no-data notification queue, after receiving one of the send message notification from the computing cluster and the receive message notification from the remote network controller, but prior to receiving the other of the send message notification from the computing cluster and the receive message notification from the remote network controller, send the receive message notification from the local computing cluster via the network controller to the remote network controller or to another remote network controller, and after receiving the other of the send message notification from the computing cluster and the receive message notification from the remote network controller, determining that the send message notification from the computing cluster matches the receive message notification from the remote network controller, and sending data from memory on the integrated computing device to the remote network controller. Sending data from the memory may additionally or alternatively include directly accessing memory on the integrated computing device. The method may additionally or alternatively include receiving additional receive message notifications from one or more additional remote network controllers on one or more additional remote integrated computing devices, and queueing the receive message notifications from the additional remote network controllers in the remote data notification queue. The method may additionally or alternatively include holding semaphores from the receive message notifications originating from the one or more remote network controllers in a semaphore buffer. The method may additionally or alternatively include segmenting the data based upon size information contained in one or more of the send message notifications queued in the local data notification queue and receive message notifications queued in the remote data notification queue before sending the data from the memory on the integrated computing device.

Another example provides a computing system, comprising one or more integrated computing devices, each integrated computing device comprising one or more computing clusters, and a plurality of network controllers, each network controller comprising a local data notification queue configured to queue send message notifications originating from one or more of the computing clusters on the integrated computing device, a remote data notification queue configured to queue receive message notifications originating from one or more remote network controllers on one or more others of the plurality of integrated computing devices, a local no-data notification queue configured to queue receive message notifications originating from the one or more clusters on the integrated computing device, and a connection scheduler configured to schedule sending of data from memory on the integrated computing device when a send message notification in the local data notification queue is matched with a receive message notification in the remote data notification queue, and to schedule sending of receive message notifications from the local no-data notification queue. Each network controller of each integrated computing device may additionally or alternatively be configured to send data from the memory of the integrated computing device by directly accessing the memory of the integrated computing device on which the network controller is located. Each of the send message notifications may additionally or alternatively include a connection number, a source memory address, a message size, a send tag, and a send-complete semaphore. Each of the receive message notifications may additionally or alternatively include a connection number, a destination memory address, a receive buffer size, a receive tag, and a receive-complete semaphore. Each network controller may additionally or alternatively be configured to determine when the send message notification in the local data notification queue is matched with the receive message notification in the remote data notification queue based on a connection number of the send message notification matching a connection number from receive message notification in the remote data notification queue.

Each network controller may additionally or alternatively include a segmenter configured to segment the data based upon size information contained in one or more of the send message notifications queued in the local data notification queue and receive message notifications queued in the remote data notification queue before sending the data from the memory on the integrated computing device. Each network controller may additionally or alternatively include a semaphore buffer configured to hold semaphores from the receive message notifications originating from the one or more remote network controllers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An integrated computing device, comprising:
   one or more computing clusters; and
   one or more network controllers, each network controller comprising
      a local data notification queue configured to queue send message notifications originating from the one or more computing clusters on the integrated computing device, each send message notification indicating data ready to be sent by a computing cluster of the one or more computing clusters on the integrated computing device;
      a remote data notification queue configured to queue incoming receive message notifications originating from one or more remote network controllers on one or more remote integrated computing devices, each incoming receive message notification indicating data that a remote integrated computing device of the one or more remote integrated computing devices is ready to receive;
      a local no-data notification queue configured to queue outgoing receive message notifications originating from the one or more computing clusters on the integrated computing device, each outgoing receive message notification indicating data ready to be received by a computing cluster of the one or more computing clusters; and
      a connection scheduler configured to schedule sending of data from memory on the integrated computing device when a send message notification in the local data notification queue is matched with an incoming receive message notification in the remote data notification queue, and to schedule sending of outgoing receive message notifications from the local no-data notification queue, such that sending of an outgoing receive message notification in the local no-data notification queue is not blocked by the send message notification queued in the local data notification queue prior to the send message notification in the local data notification queue being matched with the incoming receive message notification in the remote data notification queue.

2. The integrated computing device of claim 1, wherein the network controller is configured to send data from the memory by directly accessing the memory.

3. The integrated computing device of claim 1, wherein each of the send message notifications comprises a connection number, a source memory address, a message size, a send tag, and a send-complete semaphore.

4. The integrated computing device of claim 1, wherein each of the outgoing receive message notifications comprises a connection number, a destination memory address, a receive buffer size, a receive tag, and a receive-complete semaphore.

5. The integrated computing device of claim 1, wherein each network controller is configured to determine when a send message notification in the local data notification queue is matched with the incoming receive message notification in the remote data notification queue based on a connection number of the send message notification matching a connection number of the incoming receive message notification.

6. The integrated computing device of claim 1, wherein each of the plurality of network controllers is configured to connect to a plurality of remote network controllers.

7. The integrated computing device of claim 1, further comprising a semaphore buffer configured to hold semaphores from the incoming receive message notifications originating from the one or more remote network controllers.

8. The integrated computing device of claim 1, further comprising a segmenter configured to segment the data based upon size information contained in one or more of the send message notifications queued in the local data notification queue and incoming receive message notifications queued in the remote data notification queue before sending the data from the memory on the integrated computing device.

9. On an integrated computing device comprising one or more computing clusters and one or more network controllers, a method enacted on a network controller of the plurality of network controllers, the method comprising:
   receiving a send message notification from a computing cluster on the integrated computing device, and queueing the send message notification from the computing cluster in a local data notification queue;
   receiving an incoming receive message notification from a remote network controller on a remote integrated computing device, and queueing the incoming receive message notification from the remote network controller in a remote data notification queue;
   receiving an outgoing receive message notification from the computing cluster on the integrated computing device, and queueing the outgoing receive message notification from the computing cluster in a local no-data notification queue;
   after receiving the send message notification from the computing cluster, but prior to receiving the incoming receive message notification from the remote network controller, send the outgoing receive message notification from the local computing cluster via the network controller to the remote network controller or to another remote network controller, such that the sending of the outgoing receive message notification queued in the local no-data notification queue is not blocked by the send message notification queued in the local data notification queue prior to the send message notification in the local data notification queue being matched with the incoming receive message notification in the remote data notification queue; and after receiving the incoming receive message notification from the remote network controller, determining that the send message notification from the computing cluster matches the incoming receive message notification from the remote network controller, and sending data from memory on the integrated computing device to the remote network controller.

10. The method of claim 9, wherein sending data from the memory comprises directly accessing memory on the integrated computing device.

11. The method of claim 9, further comprising receiving additional incoming receive message notifications from one or more additional remote network controllers on one or more additional remote integrated computing devices, and queueing the incoming receive message notifications from the additional remote network controllers in the remote data notification queue.

12. The method of claim 9, further comprising holding semaphores from the incoming receive message notifications originating from the one or more remote network controllers in a semaphore buffer.

13. The method of claim 9, further comprising segmenting the data based upon size information contained in one or more of the send message notifications queued in the local data notification queue and incoming receive message notifications queued in the remote data notification queue before sending the data from the memory on the integrated computing device.

14. A computing system, comprising:
one or more integrated computing devices, each integrated computing device comprising
one or more computing clusters; and
a plurality of network controllers, each network controller comprising
a local data notification queue configured to queue send message notifications originating from the one or more computing clusters on the integrated computing device;
a remote data notification queue configured to queue incoming receive message notifications originating from one or more remote network controllers on one or more others of the plurality of integrated computing devices;
a local no-data notification queue configured to queue outgoing receive message notifications originating from the one or more clusters on the integrated computing device; and
a connection scheduler configured to schedule sending of data from memory on the integrated computing device when a send message notification in the local data notification queue is matched with an incoming receive message notification in the remote data notification queue, and to schedule sending of outgoing receive message notifications from the local no-data notification queue, such that sending of an outgoing receive message notification in the local no-data notification queue is not blocked by the send message notification queued in the local data notification queue prior to the send message notification in the local data notification queue being matched with the incoming receive message notification in the remote data notification queue.

15. The computing system of claim 14, wherein each network controller of each integrated computing device is configured to send data from the memory of the integrated computing device by directly accessing the memory of the integrated computing device on which the network controller is located.

16. The computing system of claim 14, wherein each of the send message notifications comprises a connection number, a source memory address, a message size, a send tag, and a send-complete semaphore.

17. The computing system of claim 14, wherein each of the incoming receive message notifications and each of the outgoing receive message notifications comprises a connection number, a destination memory address, a receive buffer size, a receive tag, and a receive-complete semaphore.

18. The computing system of claim 14, wherein each network controller is configured to determine when the send message notification in the local data notification queue is matched with the incoming receive message notification in the remote data notification queue based on a connection number of the send message notification matching a connection number from the incoming receive message notification in the remote data notification queue.

19. The computing system of claim 14, wherein each network controller further comprises a segmenter configured to segment the data based upon size information contained in one or more of the send message notifications queued in the local data notification queue and incoming receive message notifications queued in the remote data notification queue before sending the data from the memory on the integrated computing device.

20. The computing system of claim 14, wherein each network controller further comprises a semaphore buffer configured to hold semaphores from the incoming receive message notifications originating from the one or more remote network controllers.

* * * * *